United States Patent [19]

Kentfield et al.

[11] Patent Number: 4,697,988
[45] Date of Patent: Oct. 6, 1987

[54] REINFORCED DELTA-WING BLADE FOR WIND TURBINE

[75] Inventors: John A. C. Kentfield; Ian MacGregor, both of Calgary, Canada

[73] Assignee: Her Majesty the Queen in right of Canada, as represented by the Minister of Energy & Natural Resources, Edmonton, Canada

[21] Appl. No.: 825,879

[22] Filed: Feb. 4, 1986

[51] Int. Cl.⁴ ............................................. F03D 1/06
[52] U.S. Cl. ................................ 416/237; 416/132 B
[58] Field of Search ........... 416/237 R, 237 B, 132 B, 416/240 A, 23

[56] References Cited

U.S. PATENT DOCUMENTS

| 204,575 | 6/1878 | Hull | 416/237 R |
|---|---|---|---|
| 315,484 | 4/1885 | Cosby | 416/237 B |
| 361,709 | 4/1887 | McMaster | 416/237 B X |
| 535,956 | 3/1895 | Norcross | 416/240 A X |
| 1,133,595 | 3/1915 | Wenger | 416/132 B X |
| 1,467,227 | 9/1923 | Capell | 416/237 B X |
| 1,725,482 | 8/1929 | Schertz | 416/237 R X |
| 1,838,453 | 12/1931 | Rosen | 416/237 R |
| 2,996,120 | 8/1961 | McGregor | 416/237 B X |
| 4,191,506 | 3/1980 | Packham | 416/237 B X |
| 4,316,699 | 2/1982 | Schott et al. | 416/237 B X |
| 4,377,373 | 3/1983 | Westerhausen | 416/237 B X |

FOREIGN PATENT DOCUMENTS

| 36840 | 11/1926 | Denmark | 416/132 B |
|---|---|---|---|
| 462409 | 7/1928 | Fed. Rep. of Germany | 416/DIG. 2 |
| 321685 | 3/1902 | France | 416/240 |
| 381570 | 5/1903 | France | 416/23 |
| 444829 | 2/1949 | Italy | 416/23 |
| 165542 | 6/1921 | United Kingdom | 416/23 |

Primary Examiner—Everette A. Powell, Jr.
Attorney, Agent, or Firm—Ernest P. Johnson

[57] ABSTRACT

The flat-plate type wind turbine rotor blade comprises a rigid spoke having a single thin flexiblie skin associated therewith. The skin is formed to provide a delta-wing and a flap extension. The delta-wing and the flap extension are angularly disposed at about 25° to each other. The spoke lies along the junction of the delta-wing and the flap extension. A substantially rigid peripheral member extends along the margin of the skin. The peripheral member and the spoke are joined to provide a frame to which the skin is secured. Arrays of parallel reinforcing rib members extend between the spoke and the peripheral member. These rib members are mounted on the pressure surface of the skin. The ribs on the delta-wing are positioned at an angle of about 60° from the axis of the spoke; the ribs on the flap extension are positioned at an angle of about 75° from said axis. They therefore coincide with the main flow paths of the air flow over the blade surface.

The blade is reduced in weight and cost relative to a conventiomal double-walled blade or a single skin blade of a thickness sufficient to eliminate the need for reinforcing members.

5 Claims, 4 Drawing Figures

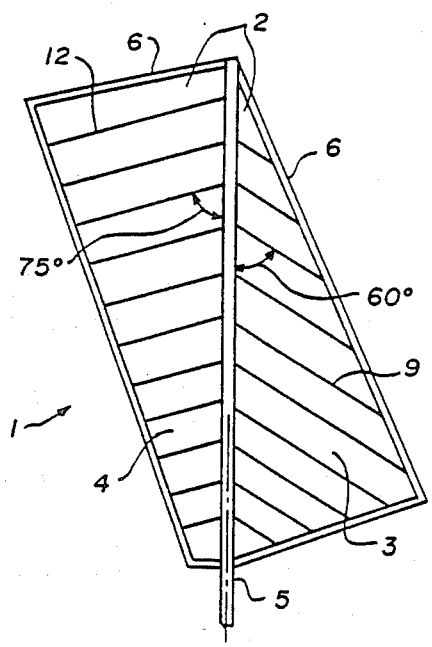
Fig. 1.
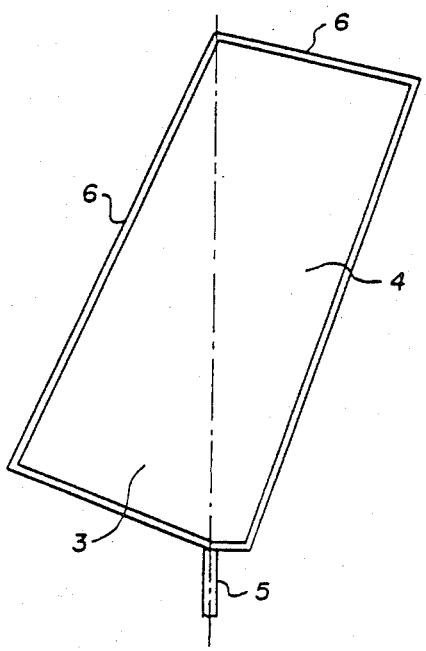
Fig. 2.
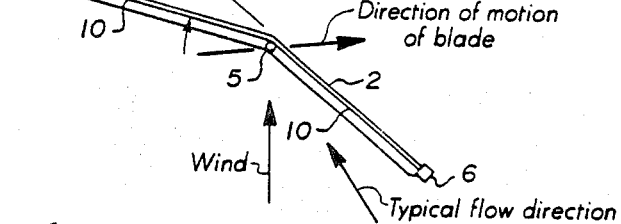
Fig. 3.
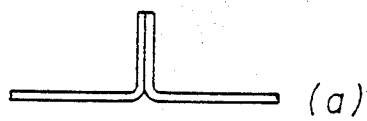
(a)
(b)
Fig. 4.
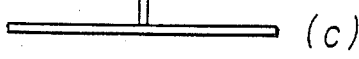
(c)
(d)

REINFORCED DELTA-WING BLADE FOR WIND TURBINE

FIELD OF THE INVENTION

This invention relates to a reinforced flat-plate type wind turbine rotor blade.

BACKGROUND OF THE INVENTION

In the so-called developing nations, wind turbines are commonly used to drive irrigation pumps and the like. Recently, there has been a resurgence of interest in the industrial nations as well with respect to these machines, due to the rise in cost of fuel and electricity.

Applicant has been involved for a number of years in the design and development of wind turbines. In this connection, there has always been an impetus to achieve efficiency but with simple structures which can be manufactured or repaired at the village level.

In earlier work, applicant produced a blade having a delta-wing and flap extension integral therewith. The delta-wing and flap extension are angularly arranged relative to each other at an angle of about 25°. This cupped blade is attached to a rigid spoke which extends radially from the turbine rotor.

This blade was found to be particularly efficient and simple to manufacture.

Applicant has disclosed the blade in a paper entitled "An axial-flow wind-turbine with delta-wing blades", published in "Alternative Energy Source", Volume 4, Hemisphere Publishing Corporation (1977).

As development work on the blade proceeded, applicant sought to utilize a single skin construction, but was confronted with the need to reinforce it.

Tests were performed to establish whether the reinforcing ribs, which were arranged in parallel arrays for structural convenience, should be secured to the suction or rear surface of the blade and protrude perpendicularly therefrom or, alternatively, the opposite (pressure) surface.

It was found, from wind-tunnel testing, that the attachment of the protruding ribs to the suction surface disrupted the double helical vortex flow pattern on said suction surface and interferred with the rotor performance. It was discovered that far less flow disruption occurred when the reinforcing ribs were attached to the pressure surface. The disturbance was further found to be minimal when the rib arrays were substantially aligned with the local flow direction.

SUMMARY OF THE INVENTION

It has therefore been found that rib reinforcement can advantageously be achieved in connection with a single skin flat-plate type wind turbine rotor blade, having a delta-wing plan form and a flap extension, said section and extension being angularly disposed to each other, said blade having a spoke lieing substantially along the junction of the delta-wing and the flap extension, by:

(a) providing a substantially rigid peripheral member extending along the margin of the skin and being connected to the spoke; and (b) providing an array of generally parallel reinforcing ribs on the pressure surface of each of the delta-wing and the flap extension, said ribs being generally perpendicular to the skin and being connected to the spoke and the peripheral member so as to combine therewith to form a substantially rigid frame for the skin, said ribs being positioned so as to substantially coincide with the direction of the local surface air flow over said pressure surface.

In a preferred embodiment, the ribs are arranged on the delta-wing at an angle of about 60° (±10°), relative to a radial axis lying along the junction of the delta-wing and flap extension, and on the flap extension at an angle of about 75° (±10°) relative to said axis.

As previously stated, applicant performed wind-tunnel tests to establish the optimum orientation for applying the reinforcing ribs or corrugations to the blade. The tests indicated that a double helical vortex air flow pattern occurred on the suction surface, and the presence of the ribs on the suction surface decreased the efficiency of the rotor blades. Applicant applied the ribs to the pressure surface instead, ascertained that the stream lines ran along the delta-wing and the flap extension surfaces at about 60° and 75° respectively, aligned the ribs with these stream lines, and found that the end product blade was uniquely strong and efficient.

This design has made it practical to construct the blades of a single skin of strips of sheet metal, in contrast to a double-walled configuration in which the reinforcing ribs are placed between two skins. There has thus been realized a reduction in blade weight and cost of manufacture.

DESCRIPTION OF THE DRAWINGS

FIG. 1 is a flat generation of the pressure side of the blade;

FIG. 2 is a flat generation of the suction side of the blade;

FIG. 3 is a radial downward view of the blade, looking toward the hub, showing the angularity of the delta-wing and the flap extension (with the upper portions item 6 omitted); and FIGS. 4(a), (b), (c), (d) are various versions of the rib structure.

DESCRIPTION THE PREFERRED EMBODIMENT

Having reference to the drawing, there is provided a blade 1 having a single skin member 2 forming a delta-wing 3 and a flap extension 4. The blade 1 further comprises a substantially rigid spoke 5 which would normally extend radially from the rotor (not shown) of a wind turbine (not shown). A substantially rigid peripheral member 6 extends along the margin of the skin member 2 and is connected with the spoke 5.

The delta-wing 3 and flap extension 4 are angularly arranged at an angle of about 25°, as illustrated in FIG. 3. The spoke 5 preferably lies along the junction of said delta-wing and flap extension 4.

An array of generally parallel ribs 9 extends between the spoke 5 and that portion of the peripheral member 6 extending along the margin of the delta-wing 3. The ribs 9 are positioned on the front or pressure surface 10 of the skin member 2. They are interconnected with the spoke 5 and peripheral member 6, so as to combine therewith to form a support frame for the delta-wing portion of the skin member 2.

An array of generally parallel ribs 12 extends between the spoke 5 and that portion of the peripheral member 6 which extends along the margin of the flap extension 4. The ribs 12 are also positioned on the pressure surface 10 and are interconnected with the spoke 5 and peripheral member 6, so as to provide a support frame for the flap extension portion of the skin member 2.

As shown in FIG. 1, the ribs 9 are positioned at an angle of 60° relative to the axis of the spoke 4 and the ribs 12 are positioned at an angle of 75° relative to said axis.

The skin member 2 is suitably secured, as by welding, to the frame consisting of the spoke 5, peripheral member 6 and ribs 9, 12.

As shown in FIG. 4, the ribs 9, 12 may conveniently be formed by turning up the adjacent edges of sheet metal strips used to make up the skin member 2. Alternatively, they can simply be provided using angle iron or flat rod.

The scope of the invention is defined in the claims that now follow.

The embodiments of the invention in which an exclusive property or privilege is claimed are defined as follows:

1. A blade assembly for the rotor of a wind turbine comprising:
   a substantially rigid spoke;
   a thin flexible skin member comprising a flat-plate type delta-wing and a flap extension extending angularly from the trailing edge of said delta-wind;
   said spoke lying along the junction of the delta-wing and the flap extension;
   a plurality of reinforcing, substantially rigid ribs, said ribs being secured to said spoke and being connected with the skin member, said ribs being disposed on the pressure surface only thereof and protruding substantially perpendicularly therefrom, said ribs being positioned to substantially coincide with the direction of the local surface air flow over said pressure surface.

2. A blade assembly for the rotor of a wind turbine comprising:
   a substantially rigid spoke;
   a thin flexible skin member comprising a flat-plate type delta-wing and a flap extension extending angularly from the trailing edge of said delta-wing;
   said spoke lying along the junction of the delta-wing and the flap extension;
   a substantially rigid peripheral member extending along the margin of the skin member, said peripheral member being secured to the spoke;
   a plurality of reinforcing, substantially rigid ribs, said ribs extending in spaced apart arrays from the spoke outwardly to the delta-wing and flap extension portions of the peripheral member and being secured to said spoke and said peripheral member to join with them to form a solid frame, said ribs being disposed on the pressure surface only of the skin member and protruding substantially perpendicularly therefrom, said ribs being positioned to substantially coincide with the direction of the local surface air flow over said pressure surface;
   said skin member being secured to said frame.

3. The blade assembly as set forth in claim 1 wherein:
   the ribs on the delta-wing are positioned at an angle of about 60° from the axis of the spoke; and
   the ribs on the flap extension are positioned at an angle of about 75° from said axis.

4. The blade assembly as set forth in claim 2 wherein:
   the ribs on the delta-wing are positioned at an angle of about 60° from the axis of the spoke; and
   the ribs on the flap extension are positioned at an angle of about 75° from said axis.

5. The blade assembly as set forth in claim 4 wherein:
   the flap extension is disposed at an angle of about 25° relative to the delta-wing.

* * * * *